United States Patent
Matsuyama et al.

(10) Patent No.: US 9,944,543 B2
(45) Date of Patent: Apr. 17, 2018

(54) POWER CONTROL DEVICE AND CONTROL METHOD FOR POWER CONTROL DEVICE

(71) Applicant: Morinaga Milk Industry Co., Ltd., Tokyo (JP)

(72) Inventors: Koki Matsuyama, Tokyo (JP); Shigehiro Kobayashi, Tokyo (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 242 days.

(21) Appl. No.: 14/896,143

(22) PCT Filed: Jun. 9, 2014

(86) PCT No.: PCT/JP2014/065226
§ 371 (c)(1),
(2) Date: Dec. 4, 2015

(87) PCT Pub. No.: WO2014/199950
PCT Pub. Date: Dec. 18, 2014

(65) Prior Publication Data
US 2016/0115047 A1 Apr. 28, 2016

(30) Foreign Application Priority Data
Jun. 10, 2013 (JP) .................................. 2013-121626

(51) Int. Cl.
*C02F 1/46* (2006.01)
*C02F 1/461* (2006.01)
*C02F 1/00* (2006.01)

(52) U.S. Cl.
CPC .......... *C02F 1/46104* (2013.01); *C02F 1/008* (2013.01); *C02F 2201/4614* (2013.01);
(Continued)

(58) Field of Classification Search
None
See application file for complete search history.

(56) References Cited

U.S. PATENT DOCUMENTS

| 2004/0121204 A1 | 6/2004 | Adelman et al. |
| 2007/0175833 A1* | 8/2007 | Ikeboh ................. C02F 1/4606 |
| | | 204/229.4 |

FOREIGN PATENT DOCUMENTS

| CN | 1156125 A | 8/1997 |
| JP | 07021188 | 4/1995 |

(Continued)

OTHER PUBLICATIONS

European Patent Office, Search Report issued in European Patent Application No. 14811616.3 dated Nov. 24, 2016, 7 pages.

(Continued)

*Primary Examiner* — Arun S Phasge
(74) *Attorney, Agent, or Firm* — Wood Herron & Evans LLP (57) ABSTRACT

A power control device supplies electrolysis voltage and electrolysis current, based on input direct-current power, to an electrolytic cell for manufacturing electrolysis water by electrolysis on a raw material solution by means of electric current applied between an anode and a cathode. The power control device includes: a voltage-current control circuit that, in a constant current control mode, supplies the electrolysis current to the electrolytic cell while the voltage-current control circuit controls the electrolysis current not to exceed a current value of a reference current, the current value of the reference current being preliminarily set according to a rated current of unit cells constituting the electrolytic cell, the voltage-current control circuit, in a constant voltage control mode, supplying the electrolysis voltage to the electrolytic cell while the voltage-current control circuit controls the electrolysis voltage not to exceed a voltage value of a reference voltage, the voltage value of the reference voltage being preliminarily set according to a rated voltage and the number of the unit cells constituting the electrolytic cell. The voltage-current control circuit switches (Continued)

between the constant current control mode and the constant voltage control mode, according to a concentration of electrolyte solution within the electrolytic cell.

12 Claims, 4 Drawing Sheets

(52) U.S. Cl.
CPC ............... *C02F 2201/4617* (2013.01); *C02F 2201/46125* (2013.01); *C02F 2201/46135* (2013.01); *C02F 2209/01* (2013.01)

(56) References Cited

FOREIGN PATENT DOCUMENTS

| | | |
|---|---|---|
| JP | 11128942 A | 5/1999 |
| JP | 2003154367 A | 5/2003 |
| JP | 2004025053 A | 1/2004 |
| JP | 2006130505 A | 5/2006 |
| JP | 2009072659 A | 4/2009 |
| JP | 2012240026 A | 12/2012 |
| JP | 2012246553 A | 12/2012 |
| JP | 2013091819 A | 5/2013 |
| KR | 20130040492 A | 4/2013 |

OTHER PUBLICATIONS

Korean Intellectual Property Office, Notice to Submit a Response issued in corresponding Korean Patent Application No. 10-2015-7034743 and English-language translation dated Jan. 25, 2016.
Chinese Patent Office, Office Action issued in Patent Application No. 201480033007.1 dated Jul. 27, 2016, 7 pages.
Japanese Patent Office, International Search Report issued in corresponding International Patent Application No. PCT/JP2014/065226 and English-language translation dated Jul. 22, 2014.

* cited by examiner

POWER CONTROL DEVICE AND CONTROL METHOD FOR POWER CONTROL DEVICE

TECHNICAL FIELD

The present invention relates to a power control device for supplying electric power to an electrolytic cell for manufacturing electrolysis water to be used for sterile water or the like by performing electrolysis on a raw material solution, and to a control method for a power control device. Priority is claimed on Japanese Patent Application No. 2013-121626, filed Jun. 10, 2013, the content of which is incorporated herein by reference.

BACKGROUND ART

Heretofore, electrolysis water, which can be obtained by conducting electrolysis of a raw material solution containing chlorine ions, by means of an electrolysis water making device, is known to have an advantageous characteristic in that it has a high level of sterilizing effect while having a low level of chlorine concentration, and it also has a high level of safety for humans. For this reason, electrolysis water is widely used in the food-related field for sterilizing food products or instruments that process food products. Particularly, in recent years, since the level of public awareness on food product hygiene management or hygiene management of food product handlers is increasing, development of an electrolysis water making device that can be used and maintained easily for general household purposes as well as commercial purposes is to be expected.

As a configuration of this electrolysis water making device, there may be considered a configuration such that a power control device is arranged between a direct-current power supply and an electrolytic cell, a desired electric current is applied to the electrolytic cell by the power control device based on the direct-current power supplied from the direct-current power supply, and electrolysis is applied to the raw material solution by means of the applied electric current in the electrolytic cell. For example, Patent Document 1 below discloses a constant current control circuit 42 that supplies desired constant electric current to an electrolytic cell 1, based on direct-current power of a direct-current power supply 41, in order to perform electrolysis on seawater that circulates within the main body of the electrolytic cell 1 (refer to paragraphs [0032] to [0033], [0049] to [0051], and FIG. 2).

PRIOR ART DOCUMENTS

Patent Documents

[Patent Document 1] Japanese Unexamined Patent Application, First Publication No. 2012-246553

SUMMARY OF THE INVENTION

Problem to be Solved by the Invention

However, in the power control device (constant current control circuit 42) disclosed in Patent Document 1, there is no disclosure of a configuration of a power control device in a case where the rated amperage, the rated voltage, and the number of cells that constitute the electrolytic cell are different. That is to say, conventionally, in the case of manufacturing an electrolysis water making device, it is necessary to manufacture a dedicated power control device for each electrolytic cell when electrolytic cells of different cell configurations are used.

The present invention takes into consideration the above circumstances, with an object of providing a highly versatile power control device that can be commonly used for electrolytic cells of different cell configurations, and a control method for a power control device.

Means for Solving the Problem

In order to solve the above problem, a first aspect of the present invention is a power control device that supplies electrolysis voltage and electrolysis current, based on input direct-current power, to an electrolytic cell for manufacturing electrolysis water by electrolysis on a raw material solution by means of electric current applied between an anode and a cathode. The power control device includes: a voltage-current control circuit that, in a constant current control mode, supplies the electrolysis current to the electrolytic cell while the voltage-current control circuit controls the electrolysis current not to exceed a current value of a reference current, the current value of the reference current being preliminarily set according to a rated current of unit cells constituting the electrolytic cell, the voltage-current control circuit, in a constant voltage control mode, supplying the electrolysis voltage to the electrolytic cell while the voltage-current control circuit controls the electrolysis voltage not to exceed a voltage value of a reference voltage, the voltage value of the reference voltage being preliminarily set according to a rated voltage and the number of the unit cells constituting the electrolytic cell. The voltage-current control circuit switches between the constant current control mode and the constant voltage control mode, according to a concentration of electrolyte solution within the electrolytic cell.

Moreover, a second aspect of the present invention, in the power control device of the first aspect above, further includes: a current detecting part that is connected to an output terminal of the voltage-current control circuit and detects a voltage arising between both ends thereof; a current limiting part that generates the reference current; and a voltage division part that detects a voltage of the output terminal and divides the detected detection voltage to generate feedback voltage. Moreover, the voltage-current control circuit includes: a voltage-current detection circuit that calculates the electrolysis current flowing through the electrolytic cell, from the voltage between the both ends of the current detecting part and a resistance value of the current detecting part; a comparator circuit that compares the electrolysis current with the reference current generated by the current limiting part to output a current comparison result signal indicating a comparison result, the comparator circuit comparing the feedback voltage with the reference voltage to output a voltage comparison result signal indicating a comparison result; and a voltage control circuit that supplies the electrolysis current from the output terminal to the electrolysis cell while the voltage control circuit controls the electrolysis current not to exceed the reference current based on the current comparison result signal, the voltage control circuit supplying the electrolysis voltage to the electrolysis cell while the voltage control circuit controls the feedback voltage not to exceed the reference voltage based on the voltage comparison result signal.

Moreover, a third aspect of the present invention, in the power control device of the second aspect above, further includes: a current limit switching circuit that causes the current limiting part to generate the reference current in response to a duty ratio-controlled pulse signal input from outside being in an ON state, the current limit switching circuit causing the current limiting part to generate a low side reference current in response to the pulse signal being in an OFF state, the low side reference current having a value smaller than that of the reference current and greater than zero. The comparator circuit compares the electrolysis current with the low side reference current flowing through the current limiting part to output the current comparison result signal indicating the comparison result, and the voltage control circuit supplies the electrolysis current from the output terminal to the electrolytic cell while the voltage control circuit controls the electrolysis current not to fall below the low side reference current based on the current comparison result signal.

Moreover, in a fourth aspect of the present invention, the voltage control circuit of the power control device of the third aspect above outputs from the output terminal an output voltage signal that is pulse-width modulated so as to correspond to the ON state and the OFF state of the pulse signal.

Furthermore, a fifth aspect of the present invention, in the power control device of the second or third aspect above, further includes: a voltage-current monitor circuit that outputs to outside, analog data indicating a current value of the electrolysis current, analog data indicating a voltage value of the electrolysis voltage, and a current detection signal indicating that the current value of the electrolysis current has fallen below the reference current.

Moreover, a sixth aspect of the present invention, in the power control device of any one of the first through third aspects above, further includes: a temperature detecting part that detects a temperature of the electrolytic cell. The voltage-current control circuit stops supply of the electrolysis voltage and the electrolysis current when the detected temperature of the temperature detecting part falls outside a preliminarily set rated temperature range. The voltage-current control circuit resumes the supply of the electrolysis voltage and the electrolysis current when the detected temperature of the temperature detecting part returns to within the rated temperature range.

Moreover, a seventh aspect of the present invention is a control method for a power control device, the power control device supplying electrolysis voltage and electrolysis current, based on input direct-current power, to an electrolytic cell for manufacturing electrolysis water by electrolysis on a raw material solution by means of electric current applied between an anode and a cathode. The control method for a power control device includes: a constant current control step of supplying the electrolysis current to the electrolytic cell while controlling the electrolysis current not to exceed a current value of a reference current, the current value of the reference current being preliminarily set according to a rated current of unit cells constituting the electrolytic cell; and a constant voltage control step of supplying the electrolysis voltage to the electrolytic cell while controlling the electrolysis voltage not to exceed a voltage value of a reference voltage, the voltage value of the reference voltage being preliminarily set according to a rated voltage and the number of the unit cells constituting the electrolytic cell, and the constant current control step and the constant voltage control step are switched between themselves, according to a concentration of electrolyte solution within the electrolytic cell.

Effect of the Invention

A power control device of the present invention supplies electric current and voltage to an electrolytic cell, based on a reference value, which is preliminarily set according to the rated current, the rated voltage, and the number of unit cells that constitute the electrolytic cell. Therefore, according to the present invention, it is possible to provide a highly versatile power control device that can be commonly used for electrolytic cells of different cell configurations, and a control method for the power control device.

EMBODIMENTS FOR CARRYING OUT THE INVENTION

Hereunder, an embodiment of the present invention is described in detail, with reference to the figures.

In the normal constant voltage electrolysis, when a constant voltage from a power supply is applied to an electrolytic cell filled with an electrolyte solution, a high current flows in the initial period of electrolysis, and then the current gradually attenuates. Therefore, in order to maintain a constant current, it is necessary to adjust the concentration of the electrolyte solution. On the other hand, in the normal constant current electrolysis, electric current is adjusted by means of voltage adjustment by adjusting the concentration of the electrolyte solution, or by means of ON/OFF control of the power supply itself.

In contrast, the electrolysis that uses the power control device of the embodiment of the present invention performs electrolysis with a constant-current and constant-voltage electrolysis method, as described in detail later. In this method, when electrolysis voltage is low (when current exceeds a set value and voltage drops), electric current is limited to a constant level, and when and after the electrolysis voltage reaches a set voltage, electrolysis is performed at the maximum electrolysis voltage.

The maximum electrolysis voltage (rated voltage) is designed preferably to 2.0V (1.5V to 2.5V) per 1 cell, according to the electrolytic cell design (cell configuration). Moreover, the maximum electrolysis current (rated amperage) is designed preferably to the current value (current density) per electrode area according to the catalyst ability of the electrode. However, without being limited to these rated amperage and rated voltage, the power control device is capable of performing constant-current and constant-voltage electrolysis regardless of the cell configuration of the electrolytic cell.

Figure 1:
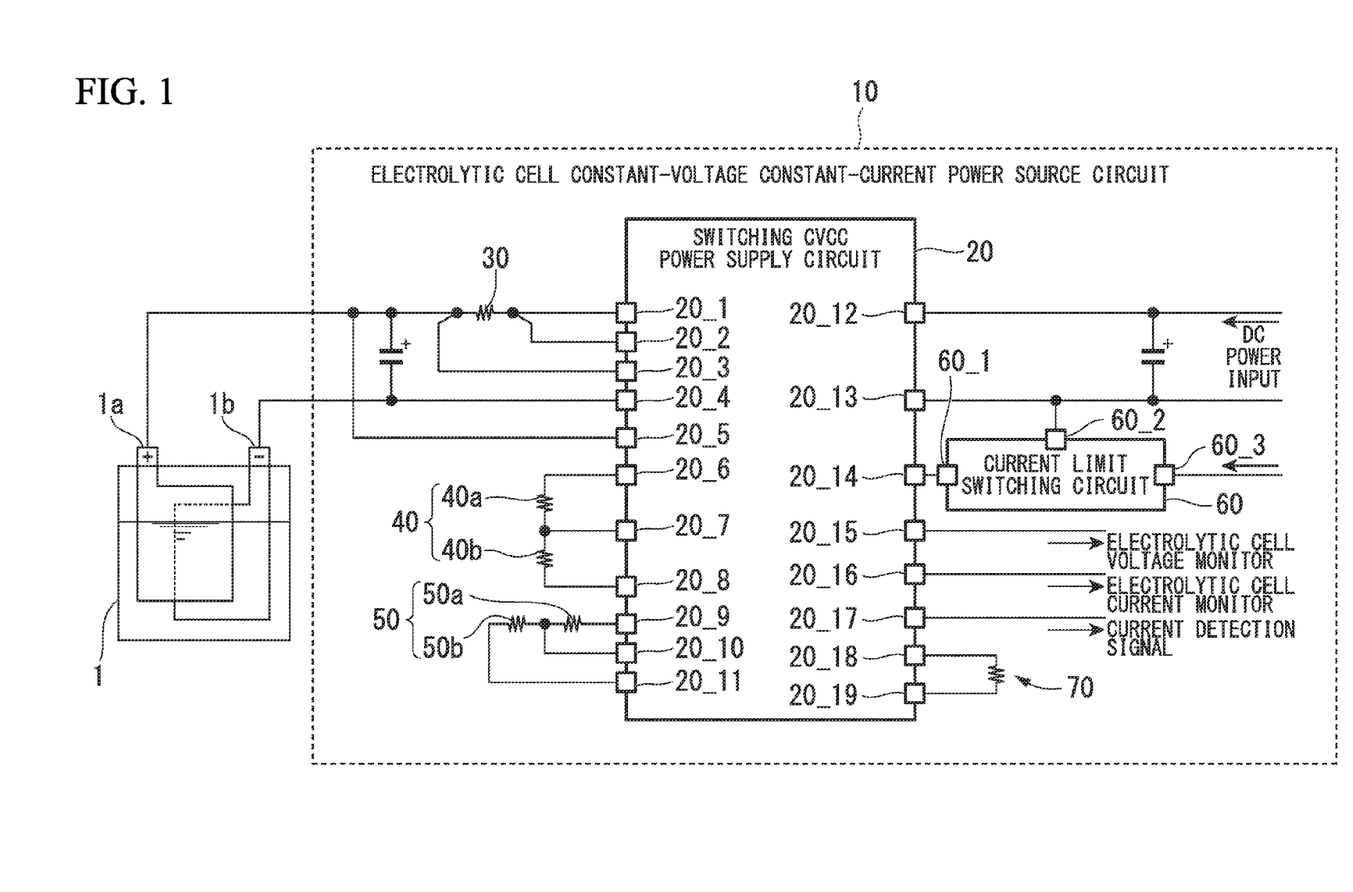
FIG. 1 is a diagram showing a schematic configuration of an electrolytic cell constant-voltage constant-current power source circuit according to the present embodiment.
Figure 2:
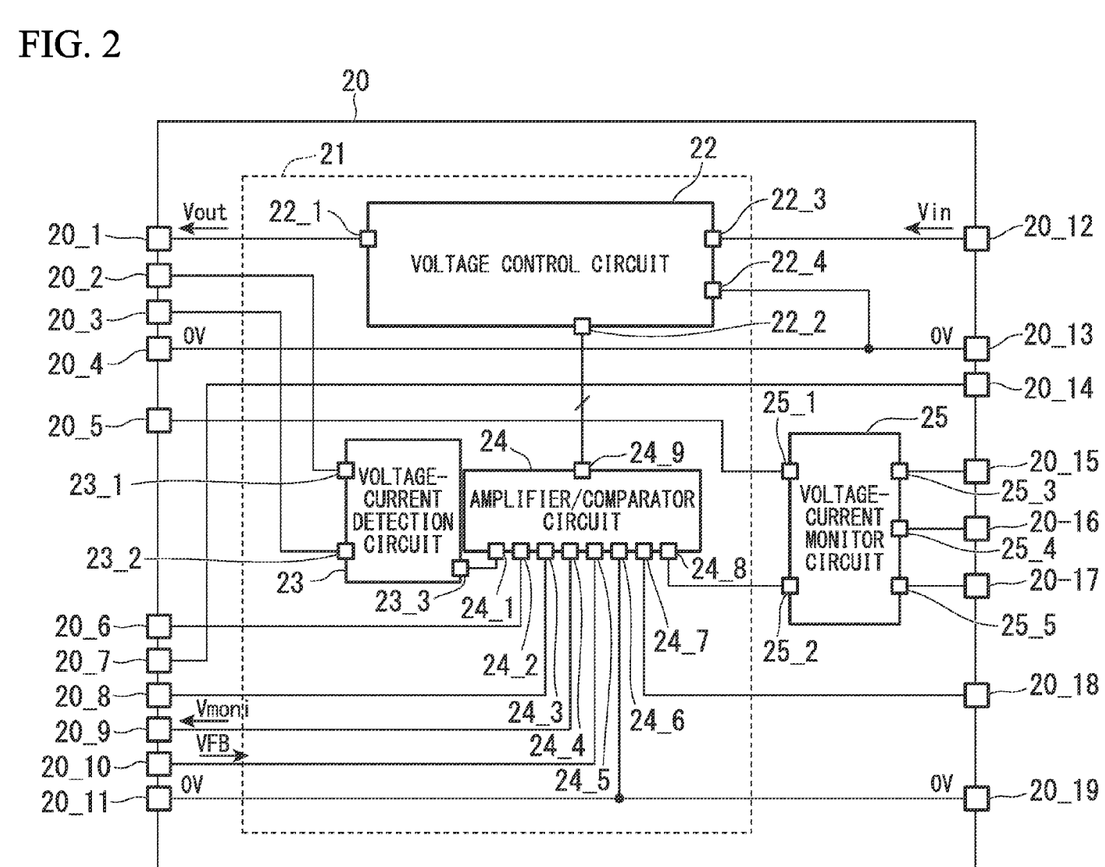
FIG. 2 is a diagram showing a schematic configuration of a switching CVCC power supply circuit shown in FIG. 1.

Hereunder, first, the configuration of an electrolytic cell constant-voltage constant-current power source circuit 10 (power control device) is described, with reference to FIG. 1 and FIG. 2. FIG. 1 is a diagram showing a schematic configuration of the electrolytic cell constant-voltage constant-current power source circuit 10 according to the present embodiment. Moreover, FIG. 2 is a diagram showing a schematic configuration of a switching CVCC (constant voltage constant current) power supply circuit 20 (voltage-current control circuit) shown in FIG. 1.

The electrolytic cell constant-voltage constant-current power source circuit 10 includes a switching CVCC power supply circuit 20, a current detecting resistor 30 (current detecting part), a current limiting resistor 40 (current limiting part), a voltage division resistor 50 (voltage division part), a current limit switching circuit 60, and a thermistor resistor 70 (temperature detecting part).

The switching CVCC power supply circuit 20, within the range that is preliminarily set for each power supply, automatically performs a constant voltage or constant current operation for the electrolytic cell 1, according to the loaded condition (the concentration of the electrolyte solution within the electrolytic cell 1) within the range of the preliminarily set reference voltage value and reference current value, which is described in detail later. Accordingly, the switching CVCC power supply circuit 20 includes no. 1 pin 20_1 to no. 19 pin 20_19 serving as terminals for connecting to respective circuits and the electrolytic cell 1 shown in FIG. 1. Moreover, the switching CVCC power supply circuit 20, as shown in FIG. 2, includes a voltage-current control circuit 21 and a voltage current monitor circuit 25. Among these, the voltage-current control circuit 21 includes a voltage control circuit 22, a voltage-current detection circuit 23, and an amplifier and comparator circuit 24 (hereunder, referred to simply as comparator circuit). The comparator circuit 24 has a function of amplifying input signals.

As shown in FIG. 1, the no. 1 pin 20_1 is connected to an anode 1a of the electrolytic cell 1 via the current detecting resistor 30. Moreover, the no. 1 pin 20_1 is connected to a no. 1 pin 22_1 of the voltage control circuit 22 shown in FIG. 2.

The voltage control circuit 22 of the switching CVCC power supply circuit 20 is a circuit that supplies electric power (electrolysis voltage, electrolysis current) from the no. 1 pin 20_1 to the anode 1a of the electrolytic cell 1. As described later, the voltage control circuit 22 supplies electric power to the electrolytic cell 1 so as not to exceed the reference current value in the constant current mode (that is to say, by means of constant current), and not to exceed the reference voltage value in the constant voltage mode (that is to say, by means of constant voltage).

As shown in FIG. 1, the no. 2 pin 20_2 is connected to one end of the current detecting resistor 30 (where the resistance value between both ends thereof is Rs), and is connected to the no. 1 pin 23_1 of the voltage-current detection circuit 23 shown in FIG. 2.

Moreover, the no. 3 pin 20_3 is connected to the other end of the current detecting resistor 30, and is connected to the no. 2 pin 23_2 of the voltage-current detection circuit 23 shown in FIG. 2.

Here, the voltage-current detection circuit 23 converts the voltage arising between both ends of the current detecting resistor 30 (the voltage between both ends thereof) into a current value of the electrolysis current flowing in the electrolytic cell 1 (calculated from the voltage between both ends and resistance value Rs), and outputs the current value after the conversion, from the no. 3 pin 23_3 to the no. 1 pin 24_1 of the comparator circuit 24.

As shown in FIG. 1, the no. 4 pin 20_4 is connected to a cathode 1b of the electrolytic cell 1. Moreover, the no. 4 pin 20_4 is a GND (ground) terminal and is grounded. Furthermore, as shown in FIG. 2, the no. 13 pin 20_13 connected to the no. 4 pin 20_4 is a GND (ground) terminal and is connected to 0V, as with the no. 4 pin 20_4.

The no. 5 pin 20_5 is connected to the anode 1a of the electrolytic cell 1. Moreover, the no. 5 pin 20_5 is connected to the no. 1 pin 25_1 of the voltage current monitor circuit 25. The voltage current monitor circuit 25, as one of its functions, outputs to outside analog data indicating the voltage value of the voltage applied to the electrolytic cell 1 (electrolysis voltage).

As shown in FIG. 1, the current limiting resistor 40 is configured with a series resistance of a current limiting resistor 40a (of resistance value RP1) and a current limiting resistor 40b (of resistance value RP2).

The no. 6 pin 20_6 is connected to one end of the current limiting resistor 40a. Moreover, the no. 6 pin 20_6 is connected to the no. 2 pin 24_2 of the comparator circuit 24.

The no. 7 pin 20_7 is connected to the common connection point of the other end of the current limiting resistor 40a and one end of the current limiting resistor 40b. As shown in FIG. 1 and FIG. 2, the no. 7 pin 20_7 is connected to the no. 1 pin 60_1 of the current limit switching circuit 60 via the no. 14 pin 20_14.

The no. 8 pin 20_8 is connected to the other end of the current limiting resistor 40b. Moreover, the no. 8 pin 20_8 is connected to the no. 3 pin 24_3 of the comparator circuit 24.

Here, the current limiting resistor 40 is a resistor that determines the current flowing to the electrolytic cell 1. Here, the relationship between the resistance set between the no. 6 pin 206 and the no. 7 pin 207 (of resistance value Rprog) and the electrolysis current Ielectrolytic is expressed as the set current formula provided in the comparator circuit 24 shown as Equation (1) below, using current comparison reference voltage Vref of a current error amplifier and resistance value Rs of the current detecting resistor 30 for example.

$$R\text{prog}=V\text{ref (V)}\times \text{constant } k/(Rs \text{ (m}\Omega\text{)} \times I\text{electrolytic}) \quad \text{Equation (1)}$$

Accordingly, each of the resistance values PR1 and PR2 of the current limiting resistor 40 are set based on Equations (2) and (3), using the reference voltage used for comparison against the electrolysis current (hereunder, referred to as current comparison reference voltage), the current values desired to be flowed to the electrolytic cell 1 (referred to as high side reference current value and low side reference current value respectively), and the internal offset voltage of the comparator circuit 24.

$$RP1=(\text{current comparison reference voltage}\times \text{constant } k)/(Rs\times\text{high side reference current}+\text{internal offset voltage}) \quad \text{Equation (2)}$$

$$RP1+RP2=(\text{current comparison reference voltage}\times \text{constant } k)/(Rs\times\text{low side reference current}+\text{internal offset voltage}) \quad \text{Equation (3)}$$

The high side reference current is the upper limit value of the electrolysis current to be supplied to the electrolytic cell 1, and the low side reference current is a lower limit value of the electrolysis current to be supplied to the electrolytic cell 1 (a current value smaller than the high side reference current, and greater than 0). Moreover, these reference currents are currents that flow between the no. 2 pin 24_2 and the no. 3 pin 24_3 of the comparator circuit 24.

Switching of the respective reference currents above is controlled by the current limit switching circuit 60. As shown in FIG. 1 and FIG. 2, in the current limit switching circuit 60, the no. 1 pin 60_1 is connected to the common connection point of the other end of the current limiting resistor 40a and one end of the current limiting resistor 40b via the no. 14 pin 20_14 and the no. 7 pin 20_7 of the switching CVCC power supply circuit 20. Moreover, the no. 2 pin 60_2 is connected to 0V via the no. 13 pin 20_13 of the switching CVCC power supply circuit 20. Also, the no. 3 pin 60_3 receives input of an ON/OFF control signal (pulse signal of controlled duty ratio) from outside. The current limit switching circuit 60 performs control to cause the current limiting resistor 40 to generate the high side reference current mentioned above, according to the ON state of the ON/OFF control signal (the state where the pulse signal level is H). Moreover, the current limit switching circuit 60 performs control to cause the current limiting resistor 40 to generate the low side reference current mentioned above, according to the OFF state of the ON/OFF control signal (the state where the pulse signal level is L).

As shown in FIG. 1, the voltage division resistor 50 is configured with a series resistance of a voltage division resistor 50a (of resistance value R1) and a voltage division resistor 40b (of resistance value R2).

The no. 9 pin 20_9 is connected to one end of the voltage division resistor 50a. Moreover, the no. 9 pin 209 is connected, for example to the no. 1 pin 20_1, and receives an input of electrolysis voltage (monitor voltage Vmoni; detection voltage) that is applied to the electrolytic cell 1. Furthermore, the no. 9 pin 209 is connected to the no. 4 pin 24_4 of the comparator circuit 24 shown in FIG. 2.

The no. 10 pin 20_10 is connected to the common connection point of the other end of the voltage division resistor 50a and one end of the voltage division resistor 50b. This common connection point is connected to the no. 5 pin 24_5 of the comparator circuit 24 via the no. 10 pin 20_10. The divided voltage that arises at this common connection point is hereunder referred to as feedback voltage VFB.

The no. 11 pin 20_11 is connected to the other end of the voltage division resistor 50b. Moreover, the no. 11 pin 20_11 is a GND terminal, and is connected to 0V. The no. 11 pin 20_11 is connected to the no. 6 pin 24_6 of the comparator circuit 24.

Here, the voltage division resistor 50 is a resistor that determines the maximum voltage to be applied to the electrolytic cell 1.

The respective resistor values R1 and R2 of the voltage division resistor 50, for example, in a return error amplifier provided in the comparator circuit 24, are set based on Equation (4) below, using the reference voltage used for comparison against the electrolysis voltage (the voltage comparison reference voltage), and the voltage value at the highest level that may be applied to the electrolytic cell 1 (the maximum voltage value of the electrolytic cell).

Maximum voltage value of electrolytic cell=voltage comparison reference voltage×(1+R1/R2)  Equation (4)

That is to say, the voltage division resistor 50, at the no. 9 pin 209, detects the voltage of the no. 1 pin 20_1 (control terminal) as a monitor voltage Vmoni. The voltage division resistor 50 divides this detected monitor voltage Vmoni to thereby cause the feedback voltage VFB to arise at the no. 10 pin 20_10. The voltage division resistor 50 outputs the feedback voltage VFB to the no. 5 pin 24_5 of the comparator circuit 24. The comparator circuit 24 receives an input of this feedback voltage VFB, and compares the feedback voltage VFB with the voltage comparison reference voltage mentioned above.

Returning to FIG. 1, the no. 12 pin 20_12 and the no. 13 pin 20_13 are connected respectively to the positive terminal and the negative terminal of an external direct-current power supply (not shown in FIG. 1) of the electrolytic cell constant-voltage constant-current power source circuit 10, and receive an input of DC power. This input power that is input (voltage and current) are set according to the rating of the electrolytic cell 1, that is, the rated current, the rated voltage, and the number of cells that constitute the electrolytic cell 1. For example, in the present embodiment, the per-cell rated voltage of the cells that constitute the electrolytic cell 1 is taken as 2V, which is a value between 1.5V and 2.5V for example, and the value yielded by multiplying this value by the number of cells, is set as an input voltage. The value of the rated voltage is not limited to the value range above, and is the total value of theoretical electrolysis voltage, over voltage, and voltage drops by solution resistance, per single cell.

The no. 15 pin 20_15 to no. 17 pin 20_17 are terminals for outputting electrolytic cell voltage monitoring, electrolytic cell current monitoring, and current detection signals respectively, to the external control device.

As shown in FIG. 2, these no. 15 pin 20_15 to no. 17 pin 20_17 are connected respectively to the no. 3 pin 25_3 to no. 5 pin 25_5, which are output terminals of the voltage current monitor circuit 25.

In the voltage current monitor circuit 25, the no. 1 pin 25_1 is connected to the no. 5 pin 20_5 of the switching CVCC power supply circuit 20 as described above. Moreover, the no. 2 pin 25_2 is connected to the no. 8 pin 24_8 of the comparator circuit 24.

The voltage current monitor circuit 25 outputs analog data that indicates the voltage being applied to the electrolytic cell 1, from the no. 3 pin 25_3 to the outside via the no. 15 pin 20_15 of the switching CVCC power supply circuit 20.

Moreover, the voltage current monitor circuit 25 outputs analog data that indicates the current being input from the comparator circuit 24 and flowing to the electrolytic cell (the current after conversion performed by the voltage-current detection circuit 23), from the no. 4 pin 25_4 to the outside via the no. 16 pin 20_16 of the switching CVCC power supply circuit 20.

Furthermore, based on the comparison result input from the comparator circuit 24 (the result of the current after conversion performed by the voltage-current detection circuit 23 being below the high side reference current mentioned above), the voltage current monitor circuit 25 outputs a current detection signal that indicates that the switching CVCC power supply circuit 20 is not supplying constant current to the electrolytic cell 1, from the no. 5 pin 25_5 to the outside via the no. 17 pin 20_17 of the switching CVCC power supply circuit 20. The current detection signal format may be a format in which the contact point (pin) is turned ON when indicating an abnormality (for example, turned to the H level), or it may be a format in which it is turned to the H level when operating normally and to the L level when operating abnormally, from a fail-safe standpoint.

Returning to FIG. 1, the no. 18 pin 20_18 and the no. 19 pin 20_19 are connected respectively to both ends of the thermistor resistor 70. The other end of the thermistor resistor 70 is connected to the no. 6 pin 24_6 of the comparator circuit 24 via the no. 19 pin 20_19, and is grounded as with the no. 11 pin 20_11. On the other hand, one end of the thermistor resistor 70 is connected to the no. 7 pin 24_7 of the comparator circuit 24 via the no. 18 pin 20_18.

When the temperature detected by the thermistor resistor 70 falls outside the preliminarily set rated temperature range of the electrolytic cell 1, the comparator circuit 24 outputs to the voltage control circuit 22, a control signal that instructs temporary stop of the electrolysis. Upon receiving an input of this control signal, the voltage control circuit 22 stops voltage supply to the electrolytic cell 1, and the electrolytic cell 1 stops electrolysis. Moreover, when the detected temperature of the thermistor resistor 70 returns to the rated temperature range, the comparator circuit 24 outputs to the voltage control circuit 22 a control signal that instructs to resume the electrolysis. Upon receiving an input of this control signal, the voltage control circuit 22 resumes voltage supply to the electrolytic cell 1, and the electrolytic cell 1 automatically resumes electrolysis.

As described above, the comparator circuit 24 shown in FIG. 2 has eight input terminals, namely no. 1 pin 24_1 to no. 8 pin 24_8, and an output terminal no. 9 pin 24_9.

The comparator circuit 24 compares the current after the conversion performed by the voltage-current detection circuit 23 that is input to the no. 1 pin 24_1 (electrolysis current), with the current flowing between the no. 1 pin 24_1 and the no. 3 pin 24_3 (the high side reference current and low side reference current flowing to the current limiting resistor 40), and outputs from the no. 9 pin 24_9 a current comparison result signal that indicates the comparison result.

Moreover, the comparator circuit 24 compares the feedback voltage VFB input to the no. 5 pin 24_5 with the voltage comparison reference voltage (the preliminarily set reference voltage), and outputs from the no. 9 pin 24_9 a voltage comparison result signal that indicates the comparison result.

The voltage control circuit 22 has a no. 3 pin 22_3 and a no. 4 pin 22_4, which are the input terminals, and a no. 1 pin 22_1, which is an output terminal, described above, and a no. 2 pin 22_2, which is an input terminal connected to the no. 9 pin 24_9 of the comparator circuit 24.

Based on the current comparison result signal input from the no. 2 pin 22_2, the voltage control circuit 22 supplies electrolysis current from the no. 1 pin 22_1 to the electrolytic cell 1 via the no. 1 pin 20_1 of the switching CVCC power supply circuit 20, in a manner that does not allow the current after the conversion performed by the voltage-current detection circuit 23 (electrolysis current) to exceed the high side reference current. That is to say, the voltage control circuit 22 supplies constant current to the electrolytic cell 1. Moreover, based on the current comparison result signal, the voltage control circuit 22 supplies electrolysis current from the no. 1 pin 22_1 to the electrolytic cell 1 via the no. 1 pin 20_1 of the switching CVCC power supply circuit 20, in a manner that does not allow the electrolysis current to fall below the low side reference current.

Also, based on the voltage comparison result signal, the voltage control circuit 22 supplies electrolysis voltage to the electrolytic cell 1 in a manner that does not allow the feedback voltage VFB to exceed the reference voltage. That is to say, constant voltage is applied to the electrolytic cell 1 in the manner that does not allow the voltage applied to the electrolytic cell 1 to exceed the maximum electrolysis voltage.

The electrolytic cell constant-voltage constant-current power source circuit 10 (power control device) has the circuit configuration described above. Accordingly, it can switch between the constant current control mode and the constant voltage control mode according to changes in the concentration of the electrolyte solution in the electrolytic cell 1, and supply an applied voltage to the electrolytic cell 1. Hereunder, the constant current control mode and the constant voltage control mode are described.

(Constant Current Control Mode)

The electrolysis current control in the electrolytic cell 1 is performed while controlling the electrolysis current detected by the current detecting resistor 30 not to exceed the set maximum electrolysis current (high side reference current). For example, if an output voltage Vout is applied from the no. 1 pin 20_1 of the switching CVCC circuit 20 to the electrolytic cell 1, the current detecting resistor 30 senses an output current to the electrolytic cell 1. The current detecting resistor (sensing resistor) measures the voltage of both ends, converts the voltage to a current signal by means of the current amplifier in the voltage-current detection circuit 23 for example, and outputs this current signal to the comparator circuit 24.

For example, the current error amplifier present in the comparator circuit 24 compares this current signal with the reference current that is set to the current limiting resistor 40 (programmable resistor), and outputs to the no. 2 pin 22_2 of the voltage control circuit 22, a signal that instructs to correct the output current (comparison result signal). Since there are a low side reference current and a high side reference current as described above, the voltage control circuit 22 includes a function to output from the no. 1 pin 20_1 an output voltage signal (output voltage Vout), which has been pulse-width modulated so as to correspond to the ON state and the OFF state of the pulse signal (ON/OFF control signal).

(Constant Voltage Control Mode)

If the concentration of the electrolyte solution becomes low in the electrolytic cell 1, the voltage rises in order to maintain a constant current. If the maximum electrolysis voltage is reached, the voltage regulating function is exerted as described above, and control is switched to the constant voltage control. The maximum electrolysis voltage level is set, using the voltage comparison reference voltage, which is preliminarily set in the comparator circuit 24, and the voltage division resistor 50 (return resistance division) present in the comparator circuit 24, which is provided between the input of the return error amplifier. The feedback voltage VFB of this voltage division resistor 50 is compared by the voltage return error amplifier in the comparator circuit 24 against the reference voltage as described above, and the output voltage from the no. 1 pin 20_1 of the voltage control circuit is controlled.

Description of Embodiment

Figure 3:
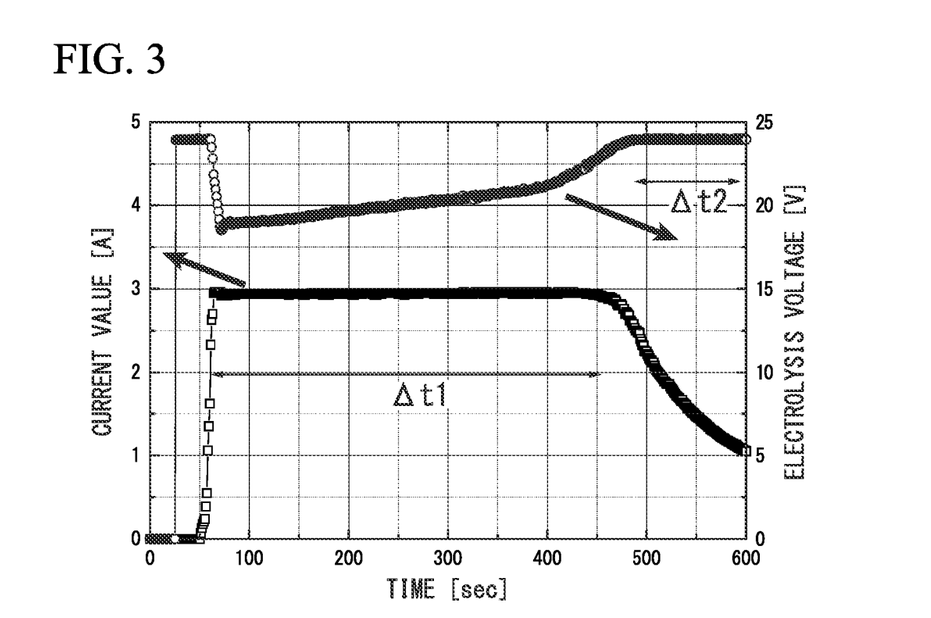
FIG. 3 is a diagram for describing controls performed by the electrolytic cell constant-voltage constant-current power source circuit.
Figure 4:
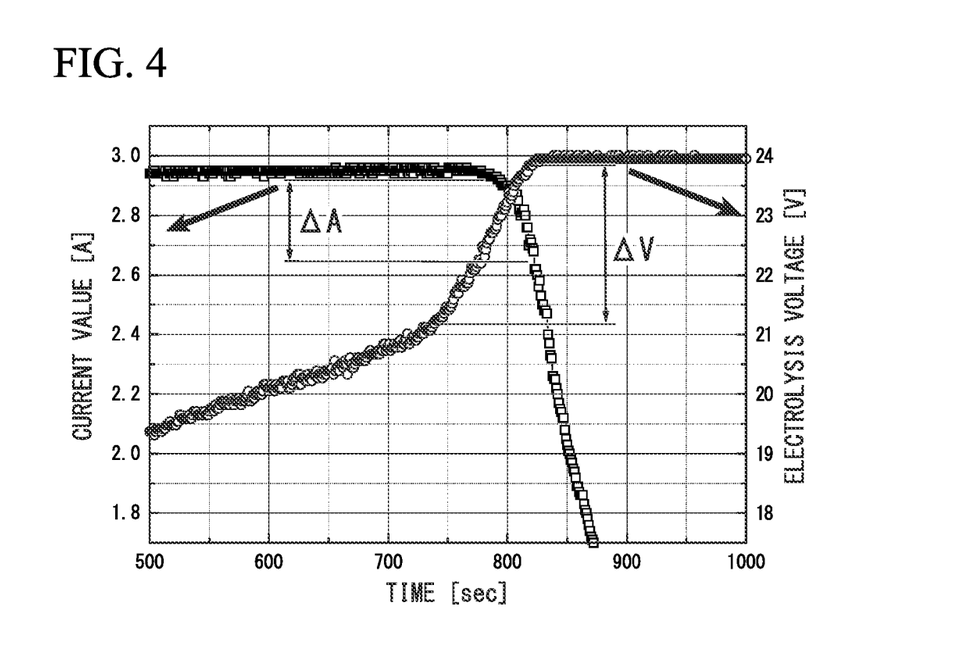
FIG. 4 is an enlarged view of the portion of switching from the constant current control to the constant voltage control shown in FIG. 3.

Next, with reference to FIG. 3 and FIG. 4, is described an operation of the electrolytic cell constant-voltage constant-current power source circuit 10 in which the constant current control mode and the constant voltage control mode are switched according to changes in the concentration of the electrolyte solution in the electrolytic cell 1, to supply an applied voltage to the electrolytic cell 1. FIG. 3 is a diagram for describing controls performed by the electrolytic cell constant-voltage constant-current power source circuit 10. FIG. 4 is an enlarged view of the portion of switching from the constant current control to the constant voltage control shown in FIG. 3. In FIG. 3 and FIG. 4, times on the horizontal axis are different. These figures show the control having been performed under the same conditions on different days and at different times.

FIG. 3 shows electrolysis in the electrolytic cell 1 that uses the electrolytic cell constant-voltage constant-current power source circuit 10 according to an embodiment of the present invention. In the graph in FIG. 3, the horizontal axis represents time, electrolysis current (electrolysis current) is plotted on the left vertical axis, and electrolytic cell voltage is plotted on the right vertical axis.

In FIG. 3, changes in electrolytic cell voltage according to time are shown on the upper portion, and changes in electrolytic cell current are shown on the lower portion. This example shown in FIG. 3 shows an electrolysis cycle in which the electrolytic cell 1 filled with hydrochloric acid serving as an electrolyte solution undergoes electrolysis. The electrolyte solution that fills the electrolytic cell 1 is not limited to hydrochloric acid.

In the electrolytic cell 1, hydrochloric acid undergoes electrolysis by means of two types of controls, namely a constant current control ($\Delta t1$) region and a constant voltage control ($\Delta t2$) region.

In the example shown in FIG. 3, the design is made so that the maximum current value of the circuit is 2.94 A and the maximum voltage is 24V where the number of cells of the electrolytic cell 1 is 12. If the electrolytic cell 1 is excessively filled with hydrochloric acid, normally an inrush current (over current) arises. However, constant current can be maintained by means of the constant current control described above, and therefore, inrush current can be prevented.

Making reference to FIG. 3, if the voltage of the electrolytic cell 1 reaches the maximum value (at approximately 480 sec in FIG. 3), the electrolytic cell constant-voltage constant-current power source circuit 10 shifts from the constant current control to the constant voltage control. In this manner, constant voltage (preliminarily set voltage comparison reference voltage described above) is automatically supplied to the electrolytic cell 1. When the electrolytic cell constant-voltage constant-current power source circuit 10 shifts to the constant voltage control, the current to the electrolytic cell 1 gradually attenuates as shown in the $\Delta t2$ region because the hydrochloric acid concentration decreases as the electrolysis progresses.

At this time, if the electrolytic cell 1 is a batch type electrolytic cell, completion of electrolysis can be shown using the current detection signal output from the no. 17 pin 20_17 after the current reaches the minimum threshold value, and the cycle of electrolysis can be ended.

On the other hand, without ending the electrolysis cycle, if hydrochloric acid is supplied to the electrolytic cell 1 during the constant voltage operation with a current detection signal serving as an operation signal of a hydrochloric acid pump that supplies hydrochloric acid to the electrolytic cell 1, the current rises to the electrolysis current value, and the control shifts to the constant current control again. By repeating the cycle of the constant current control and the constant voltage control, it is possible to perform continuous electrolysis (the range $\Delta A$ shown in FIG. 4).

Furthermore, the current is maintained constant when the voltage of the electrolytic cell 1 increases (the range $\Delta V$ shown in FIG. 4). Utilizing this fact, by supplying an appropriate amount of hydrochloric acid to the electrolytic cell 1, it is also possible to perform continuous electrolysis with constant current.

Working Example

Figure 5:
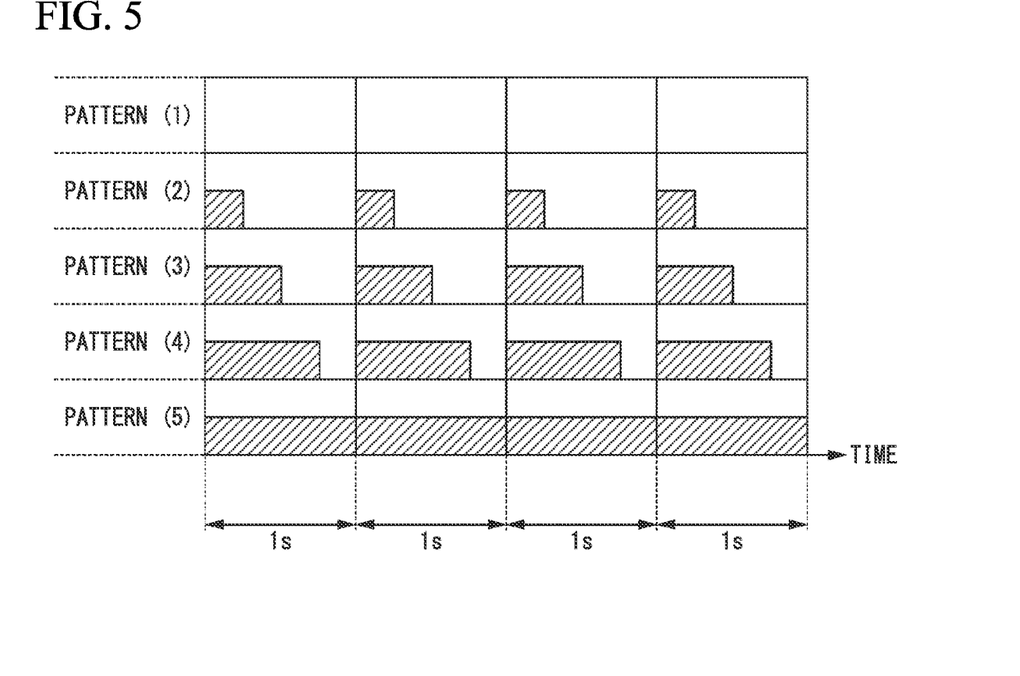
FIG. 5 is a diagram showing current control patterns in a working example of the present invention.
Figure 6:
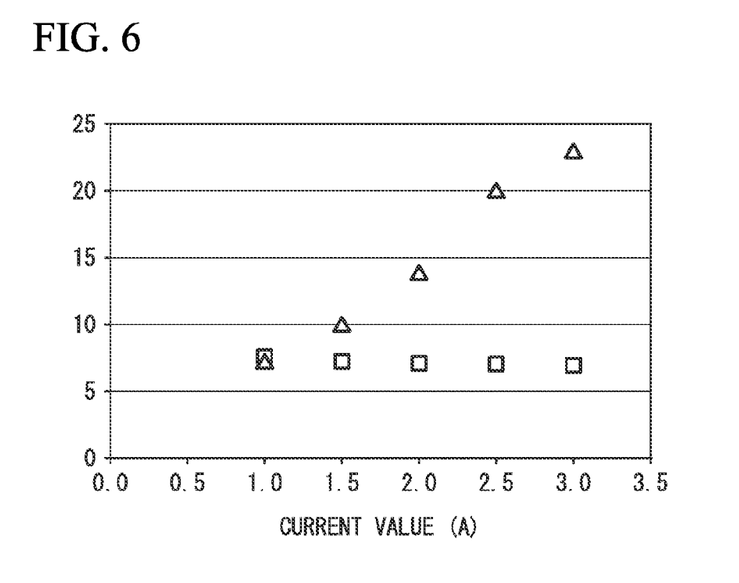
FIG. 6 is a diagram showing experiment results of the working example of the present invention.

With reference to FIG. 5, FIG. 6, and Table 1, is described a working example in which control of effective hydrochloric acid concentration was performed using the electrolytic cell constant-voltage constant-current power source circuit 10.

A constant current substrate that allows switching of the current value between 1 A and 3 A was used as a direct-current power supply. An electrolytic cell with six cells was used as the electrolytic cell 1. An adjustment was made by supplying 9% hydrochloric acid into the electrolytic cell 1 so that the electrolysis voltage would be 10V when an electrolysis current of 3 A was applied to the switching CVCC power supply circuit 20. The average current value was controlled by changing the ratio of the period where the current value of the electrolysis current in 1 cycle was 3 A and the period where it was 1 A. The length of 1 cycle was 1 second. Chlorine gas generated as a result of the electrolysis was injected into water of a flow rate of 20 L per hour.

As shown in FIG. 5, as a current control, a pulse control of the duty ratio of five patterns was performed. In the state where the pulse was an ON state, the switching CVCC power supply circuit 20 received an input of 3 A current from the constant current substrate. Moreover, in the state where the pulse was an OFF state, the switching CVCC power supply circuit 20 received an input of 1 A electrolysis current from the constant current substrate.

Next, current control patterns (1) through (5) are described.

In the current control pattern (1), the period where the input current per 1 cycle is 3 A is 0%, and the period where the input current is 1 A is 100% (duty ratio is 0%). Therefore, the average current value of the current control pattern (1) is 1 A.

In the current control pattern (2), the period where the input current per 1 cycle is 3 A is 25%, and the period where the input current is 1 A is 75% (duty ratio is 25%). Therefore, the average current value of the current control pattern (2) is 1.5 A.

In the current control pattern (3), the period where the input current per 1 cycle is 3 A is 50%, and the period where the input current is 1 A is 50% (duty ratio is 50%). Therefore, the average current value of the current control pattern (3) is 2 A.

In the current control of the current control pattern (4), the period where the input current per 1 cycle is 3 A is 75%, and the period where the input current is 1 A is 25% (duty ratio is 75%). Therefore, the average current value of the current control pattern (4) is 2.5 A.

In the current control of the current control pattern (4), the period where the input current per 1 cycle is 3 A is 100%, and the period where the input current is 1 A is 0% (duty ratio is 100%). Therefore, the average current value of the current control pattern (4) is 3 A.

Table 1 below shows data collected 10 minutes after the start of current control by the respective current control patterns (1) through (5).

TABLE 1

| Current control pattern | Average current value (A) | Chlorine concentration (ppm) | pH (—) |
| --- | --- | --- | --- |
| (1) | 1.0 | 7 | 7.47 |
| (2) | 1.5 | 10 | 7.23 |
| (3) | 2.0 | 14 | 7.05 |
| (4) | 2.5 | 20 | 6.99 |
| (5) | 3.0 | 23 | 6.91 |

FIG. 6 shows data shown in Table 1 in a graph format. In FIG. 6, the triangular symbols denote chlorine concentrations (ppm). Moreover, the rectangular symbols denote pH values.

As can be seen clearly from Table 1 and FIG. 6, a proportional relationship was found between the average current value, and the effective chlorine concentration and pH value. That is to say, the higher the average current value, the higher the effective chlorine concentration and the lower the pH value. From the above experiment results, it is confirmed that the effective chlorine concentration can be controlled by controlling the average current value.

As described above, the electrolytic cell constant-voltage constant-current power source circuit 10 of the embodiment of the present invention is a power control device that supplies electrolysis voltage and electrolysis current, based on input direct-current power, to the electrolytic cell 1 for manufacturing electrolysis water by electrolysis on a raw material solution by means of electric current applied between the anode 1a and the cathode 1b. The electrolytic cell constant-voltage constant-current power source circuit 10 has the constant current control mode in which electrolysis current is supplied to the electrolytic cell 1 while controlling the electrolysis current not to exceed the current value of the current comparison reference current (reference current which is preliminarily set according to the rated current of unit cells constituting the electrolytic cell 1). The electrolytic cell constant-voltage constant-current power source circuit 10 has the constant voltage control mode in which electrolysis voltage is supplied to the electrolytic cell while controlling the electrolysis voltage not to exceed the voltage value of the voltage comparison reference voltage (reference voltage which is preliminarily set according to the rated voltage and the number of unit cells constituting the electrolytic cell 1). The electrolytic cell constant-voltage constant-current power source circuit 10 switches between the constant current control mode and the constant voltage control mode, according to the concentration of the electrolyte solution within the electrolytic cell, to thereby supply electric power to the electrolytic cell 1.

According to the electrolytic cell constant-voltage constant-current power source circuit 10 of the embodiment of the present invention, electric current and voltage are supplied to the electrolytic cell, based on the current comparison reference voltage and the voltage comparison reference voltage (reference values which are preliminarily set according to the rated current, the rated voltage, and the number of unit cells that constitute the electrolytic cell 1). Therefore, according to the embodiment of the present invention, it is possible to provide a power control device that can also be commonly used for electrolytic cells of different cell configurations.

Moreover, in the embodiment of the present invention, by providing the current limit switching circuit 60, the current limiting resistor 40 (programming resistor) is set to RP1 and the comparator circuit 24 is controlled to the set current value (high side reference current) when the pulse signal with the controlled duty ratio is ON (H level). On the other hand, when the pulse signal with the controlled duty ratio is OFF (L level), the current limiting resistor 40 is set to RP1+RP2, and thereby the value of the current flowing to the electrolytic cell 1 can be controlled to a value that is greater than 0 A and not less than the set current value (low side reference current) and that approximates to 0 A to the greatest extent.

Conventionally, in ON/OFF control, the value of current to the electrolytic cell 1 in the OFF state was 0 A. However, galvanic action occurs between the electrolyte and the electrode in the OFF state, and as a result, the coating is detached on the electrode (baked electrode in particular) and the operating life of the electrode becomes significantly reduced.

On the other hand, in the embodiment of the present invention, the current limit switching circuit 60 is provided, and as a result, back electromotive force will not occur by applying a current in the OFF state. As a result, the operating life of the electrolytic cell 1 can be extended by reducing load on the electrode.

Moreover, the electrolytic cell constant-voltage constant-current power source circuit 10 of the embodiment of the present invention may be configured with a minimal set of electronic components (such as a resistor, voltage-current conversion circuit, and comparator) as described above. As a result, the electrolytic cell constant-voltage constant-current power source circuit 10 of the embodiment of the present invention can be supplied as a low-cost and compact component for an electrolysis water making device.

The embodiment of the invention has been described in detail with reference to the figures. However, the specific configuration is not limited to the one described above, and various design modifications may be made without departing from the scope of the invention.

INDUSTRIAL APPLICABILITY

The power control device of the present invention supplies electric current and voltage to the electrolytic cell, based on a reference value, which is preliminarily set according to the rated current, the rated voltage, and the number of unit cells that constitute the electrolytic cell. Therefore, according to the present invention, it is possible to provide a highly versatile power control device that can be commonly used for electrolytic cells of different cell configurations, and a control method for the power control device.

REFERENCE SYMBOLS

1 Electrolytic cell, 10 Electrolytic cell constant-voltage constant-current power source circuit, 20 Switching CVCC power supply circuit, 21 Voltage-current control circuit, 22 Voltage control circuit, 23 Voltage-current detection circuit, 24 Amplifier/comparator circuit, 25 Voltage/current monitor circuit, 30 Current detecting resistor, 40 Current limiting resistor, 50 Voltage division resistor, 60 Current limit switching circuit, and 70 Thermistor resistor.

The invention claimed is:

1. A power control device that supplies electrolysis voltage and electrolysis current, based on input direct-current power, to an electrolytic cell for manufacturing electrolysis water by electrolysis on a raw material solution by means of electric current applied between an anode and a cathode, the power control device comprising:

a voltage-current control circuit that, in a constant current control mode, supplies the electrolysis current to the electrolytic cell while the voltage-current control circuit controls the electrolysis current not to exceed a current value of a reference current, the current value of the reference current being preliminarily set according to a rated current of unit cells constituting the electrolytic cell, the voltage-current control circuit, in a constant voltage control mode, supplying the electrolysis voltage to the electrolytic cell while the voltage-current control circuit controls the electrolysis voltage not to exceed a voltage value of a reference voltage, the voltage value of the reference voltage being preliminarily set according to a rated voltage and the number of the unit cells constituting the electrolytic cell, wherein the voltage-current control circuit switches from the constant current control mode to the constant voltage control mode in a case where the electrolysis voltage reaches the voltage value of the reference voltage.

2. The power control device according to claim 1, further comprising:
a current detecting part that is connected to an output terminal of the voltage-current control circuit and detects a voltage arising between both ends thereof;
a current limiting part that generates the reference current; and
a voltage division part that detects a voltage of the output terminal and divides the detected detection voltage to generate feedback voltage,
wherein the voltage-current control circuit includes:
a voltage-current detection circuit that calculates the electrolysis current flowing through the electrolytic cell, from the voltage between the both ends of the current detecting part and a resistance value of the current detecting part;
a comparator circuit that compares the electrolysis current with the reference current generated by the current limiting part to output a current comparison result signal indicating a comparison result, the comparator circuit comparing the feedback voltage with the reference voltage to output a voltage comparison result signal indicating a comparison result; and
a voltage control circuit that supplies the electrolysis current from the output terminal to the electrolytic cell while the voltage control circuit controls the electrolysis current not to exceed the reference current based on the current comparison result signal, the voltage control circuit supplying the electrolysis voltage to the electrolytic cell while the voltage control circuit controls the feedback voltage not to exceed the reference voltage based on the voltage comparison result signal.

3. The power control device according to claim 2, further comprising:
a current limit switching circuit that causes the current limiting part to generate the reference current in response to a duty ratio-controlled pulse signal input from outside being in an ON state, the current limit switching circuit causing the current limiting part to generate a low side reference current in response to the pulse signal being in an OFF state, the low side reference current having a value smaller than that of the reference current and greater than zero,
wherein the comparator circuit compares the electrolysis current with the low side reference current flowing through the current limiting part to output the current comparison result signal indicating the comparison result, and
the voltage control circuit supplies the electrolysis current from the output terminal to the electrolytic cell while the voltage control circuit controls the electrolysis current not to fall below the low side reference current based on the current comparison result signal.

4. The power control device according to claim 3, wherein the voltage control circuit outputs from the output terminal an output voltage signal that is pulse-width modulated so as to correspond to the ON state and the OFF state of the pulse signal.

5. The power control device according to claim 3, further comprising:
a voltage-current monitor circuit that outputs to outside, analog data indicating a current value of the electrolysis current, analog data indicating a voltage value of the electrolysis voltage, and a current detection signal indicating that the current value of the electrolysis current has fallen below the reference current.

6. The power control device according to claim 2, further comprising:
a voltage-current monitor circuit that outputs to outside, analog data indicating a current value of the electrolysis current, analog data indicating a voltage value of the electrolysis voltage, and a current detection signal indicating that the current value of the electrolysis current has fallen below the reference current.

7. The power control device according to claim 1, further comprising:
a temperature detecting part that detects a temperature of the electrolytic cell,
wherein the voltage-current control circuit stops supply of the electrolysis voltage and the electrolysis current when the detected temperature of the temperature detecting part falls outside a preliminarily set rated temperature range, and
the voltage-current control circuit resumes the supply of the electrolysis voltage and the electrolysis current when the detected temperature of the temperature detecting part returns to within the rated temperature range.

8. The power control device according to claim 1, wherein the voltage-current control circuit switches from the constant current control mode to the constant voltage control mode in a case where the concentration of the electrolyte solution within the electrolytic cell becomes low, the electrolysis voltage raises in order to maintain the constant current, and thereby the electrolysis voltage reaches the voltage value of the reference voltage.

9. A control method for a power control device, the power control device supplying electrolysis voltage and electrolysis current, based on input direct-current power, to an electrolytic cell for manufacturing electrolysis water by electrolysis on a raw material solution by means of electric current applied between an anode and a cathode, the control method comprising:
a constant current control step of supplying the electrolysis current to the electrolytic cell while controlling the electrolysis current not to exceed a current value of a reference current, the current value of the reference current being preliminarily set according to a rated current of unit cells constituting the electrolytic cell; and
a constant voltage control step of supplying the electrolysis voltage to the electrolytic cell while controlling the electrolysis voltage not to exceed a voltage value of a reference voltage, the voltage value of the reference voltage being preliminarily set according to a rated voltage and the number of the unit cells constituting the electrolytic cell,
wherein the constant current control step and the constant voltage control step are switched from the constant current control step to the constant voltage control step in a case where the electrolysis voltage reaches the voltage value of the reference voltage.

10. The control method according to claim 9, wherein the constant current control step and the constant voltage control step are switched from the constant current control step to the constant voltage control step in a case where the concentration of the electrolyte solution within the electrolytic cell becomes low, the electrolysis voltage raises in order to maintain a constant current, and thereby the electrolysis voltage reaches the voltage value of the reference voltage.

11. A power control device that supplies electrolysis voltage and electrolysis current, based on input direct-current power, to an electrolytic cell for manufacturing electrolysis water by electrolysis on a raw material solution by means of electric current applied between an anode and a cathode, the power control device comprising:

a voltage-current control circuit that, in a constant current control mode, supplies the electrolysis current to the electrolytic cell while the voltage-current control circuit controls the electrolysis current not to exceed a current value of a reference current, the current value of the reference current being preliminarily set according to a rated current of unit cells constituting the electrolytic cell, the voltage-current control circuit, in a constant voltage control mode, supplying the electrolysis voltage to the electrolytic cell while the voltage-current control circuit controls the electrolysis voltage not to exceed a voltage value of a reference voltage, the voltage value of the reference voltage being preliminarily set according to a rated voltage and a number of the unit cells constituting the electrolytic cell;

a current detecting part that is connected to an output terminal of the voltage-current control circuit and detects a voltage arising between both ends thereof;

a current limiting part that generates the reference current;

a voltage division part that detects a voltage of the output terminal and divides the detected detection voltage to generate feedback voltage; and a current limit switching circuit that causes the current limiting part to generate the reference current in response to a duty ratio-controlled pulse signal input from outside being in an ON state, the current limit switching circuit causing the current limiting part to generate a low side reference current in response to the pulse signal being in an OFF state, the low side reference current having a value smaller than that of the reference current and greater than zero, wherein the voltage-current control circuit includes:

a voltage-current detection circuit that calculates the electrolysis current flowing through the electrolytic cell, from the voltage between the both ends of the current detecting part and a resistance value of the current detecting part, a comparator circuit that compares the electrolysis current with the reference current generated by the current limiting part to output a current comparison result signal indicating a comparison result, the comparator circuit comparing the feedback voltage with the reference voltage to output a voltage comparison result signal indicating a comparison result, and a voltage control circuit that supplies the electrolysis current from the output terminal to the electrolytic cell while the voltage control circuit controls the electrolysis current not to exceed the reference current based on the current comparison result signal, the voltage control circuit supplying the electrolysis voltage to the electrolytic cell while the voltage control circuit controls the feedback voltage not to exceed the reference voltage based on the voltage comparison result signal;

the comparator circuit compares the electrolysis current with the low side reference current flowing through the current limiting part to output the current comparison result signal indicating the comparison result;

the voltage control circuit supplies the electrolysis current from the output terminal to the electrolytic cell while the voltage control circuit controls the electrolysis current not to fall below the low side reference current based on the current comparison result signal; and the voltage-current control circuit switches from the constant current control mode to the constant voltage control mode in a case where the electrolysis voltage reaches the voltage value of the reference voltage.

12. A control method for a power control device, the power control device supplying electrolysis voltage and electrolysis current, based on input direct-current power, to an electrolytic cell for manufacturing electrolysis water by electrolysis on a raw material solution by means of electric current applied between an anode and a cathode, the control method comprising:

a constant current control step of supplying the electrolysis current to the electrolytic cell while controlling the electrolysis current not to exceed a current value of a reference current, the current value of the reference current being preliminarily set according to a rated current of unit cells constituting the electrolytic cell; and a constant voltage control step of supplying the electrolysis voltage to the electrolytic cell while controlling the electrolysis voltage not to exceed a voltage value of a reference voltage, the voltage value of the reference voltage being preliminarily set according to a rated voltage and the number of the unit cells constituting the electrolytic cell, wherein the constant current control step and the constant voltage control step are switched between themselves, according to a concentration of electrolyte solution within the electrolytic cell, a voltage arising between both ends of a current detecting part is detected, the detecting part being connected to an output terminal of a voltage-current control circuit of the power control device, the reference current is generated by a current limiting part of the power control device, a voltage of the output terminal is detected, and the detected detection voltage is divided and thereby feedback voltage is generated, the electrolysis current flowing through the electrolytic cell is calculated, from the voltage between the both ends of the current detecting part and a resistance value of the current detecting part, the electrolysis current is compared with the reference current generated by the current limiting part and thereby a current comparison result signal indicating a comparison result is output, the feedback voltage is compared with the reference voltage and thereby a voltage comparison result signal indicating a comparison result is output, the electrolysis current is supplied from the output terminal to the electrolytic cell while the electrolysis current is controlled not to exceed the reference current based on the current comparison result signal, the electrolysis voltage is supplied to the electrolytic cell while the feedback voltage is controlled not to exceed the reference voltage based on the voltage comparison result signal, the current limiting part is caused to generate the reference current in response to a duty ratio-controlled pulse signal input from outside being in an ON state, the current limiting part is caused to generate a low side reference current in response to the pulse signal being in an OFF state, the low side reference current having a value smaller than that of the reference current and greater than zero, the electrolysis current is compared with the low side reference current flowing through the current limiting part and thereby the current comparison result signal indicating the comparison result is output, and the electrolysis current is supplied from the output terminal to the electrolytic cell while the electrolysis current is controlled not to fall below the low side reference current based on the current comparison result signal.

\* \* \* \* \*